3,160,599
STAIN-RESISTANT VINYL CHLORIDE COMPOSITION CONTAINING A MONOISOBUTYRATE MONOBENZOATE ESTER OF 2,2,4-TRIMETHYLPENTANEDIOL-1,3 AS PLASTICIZER

James P. Scullin, Pompton Lakes, N.J., assignor, by mesne assignments, to Heyden Newport Chemical Corporation, New York, N.Y., a corporation of Delaware
No Drawing. Filed June 5, 1961, Ser. No. 114,648
5 Claims. (Cl. 260—31.6)

The present invention relates to polyvinyl chloride resin compositions and their use and more particularly relates to such compositions having a high resistance to discoloration by staining.

Vinyl chloride resins may be utilized in many applications due to their wide range of properties. These resins which may be vinyl chloride homopolymers or copolymers are difficult to process and are quite brittle. Accordingly, it is necessary to add to the resin a plasticizing agent. In general, the plasticizer should be compatible with the resin in an amount sufficient to impart the desired properties to the resulting composition which should possess satisfactory strength, flexibility and toughness for the use intended. The plasticized material should retain the plasticizer upon long periods of exposure over the wide range of temperatures encountered during use.

While the plasticized vinyl chloride resin compositions should be formulated to provide the above-mentioned desirable properties, the most desirable properties depend to a certain extent upon the particular use of the composition. Vinyl resin compositions, for example, are often used as protective coverings for surfaces and usually are designed to decorate and enhance the appearance of the area. In many uses these protective surface coverings are exposed to wear and abrasion and in addition are exposed to action by other materials which tend to discolor or stain the composition thereby materially reducing the decorative appearance of the covering. The problem of staining is not limited to but is especially serious in vinyl chloride covering compositions used on walls, floors, counter tops and other areas where there is frequent exposure to and contact with materials which tend to stain and discolor.

It has been discovered that polyvinyl chloride resin compositions have unusual and excellent resistance to staining when the polyvinyl chloride is plasticized with the monoisobutyrate monobenzoate ester of 2,2,4-trimethylpentanediol-1,3. The present plasticizers include the 1-monoisobutyrate 3-monobenzoate ester of 2,2,4-trimethylpentanediol-1,3, the 3-monoisobutyrate 1-monobenzoate ester of 2,2,4-trimethylpentanediol-1,3, as well as mixtures thereof. The aforesaid dihydric alcohol has the formula,

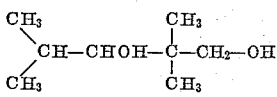

The present esters may be prepared in any suitable manner by esterifying one of the alcoholic hydroxyl groups with benzoic acid and the other alcoholic hydroxyl group with isobutyric acid or vice versa. This can be accomplished by heating about stoichiometric quantities of the alcohol and acids, preferably in the presence of an esterification catalyst, in which a mixture of isomers is obtained. Alternatively either isomer can be prepared by reacting one of these acids with the half ester of 2,2,4-trimethyl pentanediol-1,3. For example, the 1-monoisobutyrate 3-monobenzoate ester can be prepared by esterifying the 1-monoisobutyrate ester of 2,2,4-trimethylpentanediol-1,3 with benzoic acid or its equivalent. The present invention is not limited to any particular method of producing these esters which may be represented by the following structural formula:

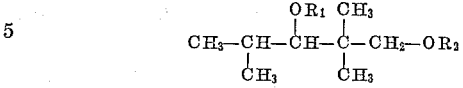

wherein $R_1$ and $R_2$ together represent the radicals

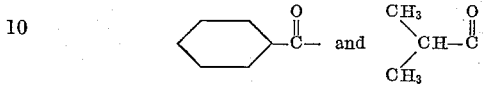

More particularly the two isomers have the formulae:

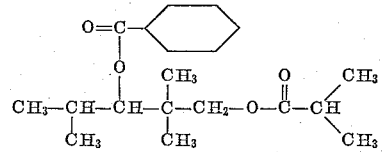

1-monoisobutyrate 3-monobenzoate ester of 2,2,4-trimethylpentanediol-1,3

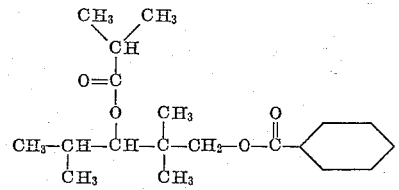

1-monobenzoate 3-monoisobutyrate ester of 2,2,4-trimethylpentanediol-1,3.

For example, the 1-monoisobutyrate 3-monobenzoate ester can be prepared from the 1-monoisobutyrate ester of 2,2,4-trimethylpentanediol-1,3 by the following procedure. Charge one gram molecular weight of the 1-monoisobutyrate ester of 2,2,4-trimethylpentanediol-1,3 into a reaction vessel. Thereafter gradually add about one gram molecular weight of benzoyl chloride with agitation and while maintaining the reaction mixture at an elevated temperature of about 110–120° C. When the generation of gaseous hydrochloric acid ceases, cool the reaction mixture and mix with benzene to take up the ester. Separate the benzene and aqueous layers and wash the benzene solution with dilute aqueous sodium hydroxide. The washed solution should be mixed with activated carbon to remove color bodies and the residual water and benzene removed by distillation. The activated carbon can be separated by filtration from the 1-monoisobutyrate 3-monobenzoate ester of 2,2,4-trimethylpentanediol-1,3.

The vinyl chloride polymers which may be used are the resinous products obtained by the polymerization of vinyl chloride in the presence or absence of another polymerizable compound. The term "vinyl chloride resin" includes vinyl chloride homopolymers as well as copolymers, such as those formed between vinyl chloride and at least one other polymerizable mono-olefin, such as vinyl bromide, vinyl acetate, vinyl propionate, vinyl butyrate, vinylidene chloride, styrene, methylmethacrylate, dialkyl fumarate or maleate, and the like. The copolymers useful in the practice of this invention are those prepared from at least 70% of vinyl chloride and up to 30% of other copolymerizable mono-olefinic compound.

The amount of the present plasticizer used may be varied over a wide range depending upon the characteristics desired in the end product. In general, the amount of plasticizer used will be in the range of 5–100 parts per 100 parts by weight of vinyl chloride resin. In most instances, the plasticizer will be used in amounts ranging from 10 to 90 parts per hundred parts of resin.

The resinous compositions also may include additives other than plasticizers which are normally incorporated in vinyl resin compositions. Generally such compositions include one or more stabilizers to impart resistance to thermal degradation. Inorganic fillers, either fibrous or non-fibrous, as well as pigments may be used where desirable. In addition other resin additives, such as solvents, diluents, binders and the like may be employed. However, diluents and solvents should be removed by evaporation from the finished or dried product as their presence reduces the stain resistance properties. Other plasticizers may be present if they do not materially reduce the resistance of the resinous composition to staining.

Vinylchloride resins plasticized with the present plasticizers are characterized by unusual resistance to staining. The plasticized resins may be used in preparing compositions for any purpose. However, the problem of staining is more pronounced in light colored articles, for example, white vinyl chloride resin compositions containing a white pigment such as titanium dioxide. Staining is also a serious problem in covering materials for floors, countertops and walls, especially when the covering material includes an upper layer of clear vinyl chloride resin. Some covering materials comprise, for example, a layer of backing material presenting an upper surface bearing a decorative design and a protective covering film or layer of clear vinyl chloride resin overlying the decorated surface. While the plasticized vinyl chloride resins of the present invention are not limited to use in floor coverings, and the like, these resins are particularly useful for this purpose.

The present plasticizers may be incorporated in the vinyl chloride resin, along with or without other additions, by any suitable process such as calendering, mixing or kneading of the ingredients. A desirable procedure involves forming a vinyl resin dispersion which can be cast in a film or thicker body, and then heated to form a homogeneous body of plasticized resin. Such dispersions are suspensions of vinyl chloride resin particles in nonaqueous liquids including the plasticizer which do not dissolve the resin at ordinary temperatures but do at elevated temperatures. If the liquid phase consists only of plasticizer, the dispersion is termed a "plastisol," whereas if the dispersing liquid also contains volatile components which evaporate upon heating, the dispersion is termed an "organosol." Both plastisols and organosols may include other additives, including stabilizers, normally used in vinyl chloride resin compositions. A floor covering, for example, can be produced by casting a thin layer of an organosol or plastisol onto the upper, decorated surface of the backing and then heating the dispersion to fuse the resin and evaporate the solvent, if any.

EXAMPLE 1

Three organosols, each containing a different plasticizer, were prepared by mixing the following ingredients in a mixer at room temperature until a uniform dispersion of the vinyl chloride resin particles was obtained:

| | Grams |
|---|---|
| Vinyl chloride resin | 100 |
| Plasticizer | 28 |
| Stabilizer | 5 |
| Epoxidized soy bean oil | 6 |
| Mineral spirits | 18 |
| Diisobutyl ketone | 2 |

The plasticizers used in the three batches were dioctyl phthalate, the 1-isobutyrate 3-monobenzoate ester of 2,2,4-trimethylpentanediol-1,3 and butyl benzyl phthalate. The vinyl chloride resin was in particle form and was a homopolymer of vinyl chloride. The stabilizer was in each instance a mixture of barium, cadmium and zinc soaps mixed with an organic phosphite. For present purposes any customary stabilizer could have been used. The epoxidized soy bean oil is both a plasticizer and stabilizer and could have been left out as could the solvent, diisobutyl ketone.

After thorough mixing the organosols were cast in films on glass and fused for 15 minutes at 375° F. Staining agents, brown shoe polish (paste), mustard (French's), red lipstick, crayon (red china-marker), ball point pen ink (blue), and tobacco juice, were smeared on the fused films which were then heated in an oven at 120° F. for 20 hours. At the end of this period the mustard and tobacco juice were wiped off with cloths wet with water and the other agents were wiped off with hexane. Visual observations of residual stains were made and the results are set forth in the following table, Table I:

Table I

| Staining Agent | Batch 1 | Batch 2 | Batch 3 |
|---|---|---|---|
| Shoe Polish | No stain | Severe | Severe. |
| Mustard | do | do | Moderate. |
| Lipstick | Moderate | do | Severe. |
| Crayon | do | Moderate | Slight. |
| Ball Point Ink | Slight | do | Moderate. |
| Tobacco Juice | No Stain | No Stain | No Stain. |

The plasticizers in each batch were as follows:

Batch 1—1-monoisobutyrate 3-monobenzoate of 2,2,4-trimethylpentanediol-1,3.
Batch 2—Dioctyl phthalate.
Batch 3—Butyl benzyl phthalate.

In addition to resisting staining by the above-mentioned materials, it has been found that vinyl chloride resins plasticized with the plasticizer of the present invention also resist staining by oil-soluble dyes.

EXAMPLE 2

Three plastisols were prepared using the three plasticizers described in Example 1. The formulation was as follows:

| | Grams |
|---|---|
| Vinyl chloride | 100 |
| Plasticizer | 70 |
| Stabilizer | 2 |

The stabilizer was a mixture of barium, cadmium, and zinc soaps and organic phosphite sold under "NUO-STABE 924." The vinyl resin was a homopolymer sold as "GEON 121." Each plastisol was stirred for 15 min. at room temperature with a mixer. Viscosity was measured with Brookfield Viscosimeter Model RVF at spindle speeds of 2, 4 and 10 r.p.m. Measurements were made at zero time and after ageing at 25° C. for 1 hr., 1 day and 37 days.

Fusion temperatures were determined using freshly prepared plastisols of the above formulation. Weighed amounts, sufficient to produce a specimen about ¼ inch thick were contained in aluminum foil weighing dishes, and in a forced-circulation oven for 5 min. at various temperatures. The degree of fusion was estimated by manually bending and tearing the specimen after it had been cooled to room temperature.

Table II

VISCOSITY OF PLASTISOLS

| Plasticizer | Spindle Speed, r.p.m. | Viscosity at 25° C., Centipoises | | | |
|---|---|---|---|---|---|
| | | Initial | 1 Hr. | 24 Hrs. | 37 Days |
| Lot 1 | 2 | 3,240 | 4,600 | 12,400 | 24,000 |
| Do | 4 | 2,600 | 3,640 | 9,200 | 16,000 |
| Do | 10 | 1,940 | 2,650 | | 10,800 |
| Lot 2 | 2 | 5,920 | 8,960 | 21,400 | 62,000 |
| Do | 4 | 4,820 | 7,280 | 16,000 | 41,500 |
| Do | 10 | 3,730 | | | 26,200 |
| Lot 3 | 2 | 5,320 | 8,720 | 27,600 | 99,000 |
| Do | 4 | 4,520 | 7,020 | 23,700 | 75,000 |
| Do | 10 | 3,660 | | | 52,400 |

Table III
FUSION TEMP. OF PLASTISOLS

| Plasti- cizer | Condition After 5 Min. Fusion | | |
|---|---|---|---|
| | 280° F. | 300° F. | 340° F. |
| Lot 1 | Crumbly | Crumbly | Fused, fair tear strength. |
| Lot 2 | ----do---- | ----do---- | Partly fused, low tear strength. |
| Lot 3 | Partly fused, low tear strength. | Partly fused, low tear strength. | Fused, good tear strength. |

In each instance the plasticizers were as follows:

Lot 1—The 1-monoisobutyrate 3-monobenzoate ester of 2,2,4-trimethylpentanediol-1,3.
Lot 2—Dioctyl phthalate.
Lot 3—Butyl benzyl phthalate.

From the results set forth in Tables II and III it can be seen that the plastisols containing the present plasticizers have low viscosities, are stable and the fusion temperature is in the range of plastisols containing dioctyl phthalate.

In either of the preceding formulations, pigments and/or other additives could have been included.

I claim:

1. A stain-resistant resinous composition comprising a vinyl chloride resin selected from the group consisting of polyvinyl chloride and copolymers prepared from vinyl chloride and up to 30% of another polymerizable monoolefin and containing as plasticizer from 5 to 100 parts per 100 parts of said vinyl chloride resin of a monoisobutyrate monobenzoate ester of 2,2,4-trimethylpentanediol-1,3.

2. A stain-resistant resinous composition as set forth in claim 1 wherein the vinyl chloride resin is polyvinyl chloride.

3. A stain-resistant resinous composition as set forth in claim 1 wherein the plasticizer is the 1-monoisobutyrate 3-monobenzoate ester of 2,2,4-trimethylpentanediol-1,3.

4. A white, strain-resistant resinous composition comprising (a) a vinyl chloride resin selected from the group consisting of polyvinyl chloride and copolymers prepared from vinyl chloride and up to 30% of another polymerizable monoolefin, (b) titanium dioxide pigment, and (c) from 10 to 90 parts per 100 parts of said vinyl chloride resin of a monoisobutyrate monobenzoate ester of 2,2,4-trimethylpentanediol-1,3.

5. A protective and decorative surface-covering material comprising a backing having a decorated surface covered with a substantially clear, stain-resistant film of polyvinyl chloride containing as plasticizer from 10 to 90 parts per 100 parts of said polyvinyl chloride of a monoisobutyrate monobenzoate ester of 2,2,4-trimethylpentanediol-1,3.

References Cited by the Examiner
UNITED STATES PATENTS

| | | | |
|---|---|---|---|
| 2,454,274 | 11/48 | Daly et al. | 260—476 |
| 2,499,984 | 3/50 | Beavers et al. | 260—31.6 |
| 2,700,656 | 1/55 | Emerson et al. | 260—31.6 |
| 2,766,266 | 10/56 | Emerson et al. | 260—476 |

ALEXANDER H. BRODMERKEL, *Primary Examiner.*
LEON J. BERCOVITZ, MORRIS LIEBMAN,
*Examiners.*

Disclaimer 3,160,599.—*James P. Scullin,* Pompton Lakes, N.J. STAIN-RESISTANT VINYL CHLORIDE COMPOSITION CONTAINING A MONOISOBUTYRATE MONOBENZOATE ESTER OF 2,2,4-TRIMETHYLPENTANEDIOL-1,3 AS PLASTICIZER. Patent dated Dec. 8, 1964. Disclaimer filed June 20, 1968, by the assignee, *Tenneco Chemicals, Inc.*

Hereby enters this disclaimer to claims 1, 2 and 3 of said patent.
[*Official Gazette September 17, 1968.*]